(12) United States Patent
Ling et al.

(10) Patent No.: US 11,004,037 B1
(45) Date of Patent: May 11, 2021

(54) PRODUCT DESIGN AND MATERIALS DEVELOPMENT INTEGRATION USING A MACHINE LEARNING GENERATED CAPABILITY MAP

(71) Applicant: Citrine Informatics, Inc., Redwood City, CA (US)

(72) Inventors: Julia Black Ling, Redwood City, CA (US); Alexander Willem Anton van Grootel, San Francisco, CA (US); Jason Stuart Koeller, Redwood City, CA (US); James Samuel Peerless, Durham, NC (US); Erin Melissa Tan Antono, San Francisco, CA (US); Gregory Joseph Mulholland, San Francisco, CA (US)

(73) Assignee: CITRINE INFORMATICS, INC., Redwood City, CA (US)

( * ) Notice: Subject to any disclaimer, the term of this patent is extended or adjusted under 35 U.S.C. 154(b) by 0 days.

(21) Appl. No.: 17/075,031

(22) Filed: Oct. 20, 2020

Related U.S. Application Data

(60) Provisional application No. 63/041,374, filed on Jun. 19, 2020, provisional application No. 62/942,406, filed on Dec. 2, 2019.

(51) Int. Cl.
*G06Q 10/10* (2012.01)
*G06N 20/00* (2019.01)
(Continued)

(52) U.S. Cl.
CPC .......... *G06Q 10/101* (2013.01); *G06N 20/00* (2019.01); *G06Q 10/06375* (2013.01);
(Continued)

(58) Field of Classification Search
CPC ........ G06N 20/00; G16C 20/30; G16C 20/70; G06Q 50/04; G06F 30/27; G06F 30/00; G06F 2119/18
See application file for complete search history.

(56) References Cited

U.S. PATENT DOCUMENTS 5,717,598 A * 2/1998 Miyakawa ......... G05B 19/4097
700/103
5,822,206 A * 10/1998 Sebastian ........... G05B 19/4097
700/97

(Continued)

FOREIGN PATENT DOCUMENTS

JP 2005-250527 A 9/2005
JP 2008-052465 A 3/2008
(Continued)

OTHER PUBLICATIONS

Kalindindi, Surya R. et al., Role of materials data science and informatics in accelerated materials innovation MRS Bulletin, vol. 41, Aug. 2016 (Year: 2016).*
(Continued)

*Primary Examiner* — Scott L Jarrett
(74) *Attorney, Agent, or Firm* — Fenwick & West LLP

(57) ABSTRACT

A device generates a capability map. The device receives one or more design spaces from a materials supplier, the one or more design spaces including candidate components and capabilities of tools available to the materials supplier. The device inputs a design space of the one or more design spaces into a machine learning model, the training data including a plurality of components including input materials and/or chemicals, and, for respective combinations of the plurality of components, a plurality of respective performance properties. The device receives as output from the model a capability map of the materials supplier storing possible combinations of performance properties and a (Continued)

respective difficulty of developing a composition with that combination of performance properties. The device outputs a user interface for display to a user indicating data of the capability map.

18 Claims, 10 Drawing Sheets

(51) Int. Cl.
    *G06Q 50/04*     (2012.01)
    *G06Q 10/06*     (2012.01)
    *G06Q 10/08*     (2012.01)

(52) U.S. Cl.
    CPC ..... *G06Q 10/06395* (2013.01); *G06Q 10/087* (2013.01); *G06Q 50/04* (2013.01)

(56) References Cited

U.S. PATENT DOCUMENTS

| | | | | |
|---|---|---|---|---|
| 6,110,213 | A * | 8/2000 | Vinciarelli | G06F 30/00 703/1 |
| 7,499,841 | B2 * | 3/2009 | Hoffman | G06F 30/00 703/2 |
| 10,366,779 | B2 * | 7/2019 | Hsu | G16C 20/70 |
| 10,515,715 | B1 * | 12/2019 | Pappas | G16C 20/10 |
| 10,657,300 | B1 * | 5/2020 | Kim | G06N 20/20 |
| 10,861,588 | B1 * | 12/2020 | Pappas | G16C 20/30 |
| 2005/0015740 | A1 * | 1/2005 | Sawicki | G06F 30/00 703/7 |
| 2005/0096895 | A1 * | 5/2005 | Wollenberg | G06Q 50/04 506/8 |
| 2005/0188338 | A1 * | 8/2005 | Kroyan | G06F 30/39 716/124 |
| 2005/0234684 | A1 * | 10/2005 | Sawicki | G06F 30/398 703/1 |
| 2009/0031271 | A1 * | 1/2009 | White | G06F 30/39 716/122 |
| 2015/0127131 | A1 * | 5/2015 | Herrman | G05B 19/4097 700/98 |
| 2015/0127480 | A1 * | 5/2015 | Herrman | G06Q 30/0283 705/26.4 |
| 2016/0217221 | A1 * | 7/2016 | Bhat | G06F 30/20 |
| 2018/0113967 | A1 * | 4/2018 | Agrawal | G01N 33/2022 |
| 2019/0171793 | A1 * | 6/2019 | Aykol | G16C 20/90 |
| 2020/0034367 | A1 * | 1/2020 | Iwasaki | G06F 16/2465 |
| 2020/0089706 | A1 * | 3/2020 | Nomoto | G06F 16/9017 |
| 2020/0302100 | A1 * | 9/2020 | Teplinsky | G06N 20/00 |
| 2020/0401113 | A1 * | 12/2020 | Yuan | G06N 20/00 |

FOREIGN PATENT DOCUMENTS

| | | |
|---|---|---|
| WO | WO 2007/017738 A2 | 2/2007 |
| WO | WO 2019/060268 A1 | 3/2019 |

OTHER PUBLICATIONS

Hill, Joanne et al., Chapter 9: Materials Data Infrastructure and Material Informatics Computational Material System Design, Spring International Publishing, 2019 (Year: 2018).*
Borg, Chris, Citrine Informatics—Introduction to Citrine and Citrination Mar. 6, 2018 (Year: 2018).*
Ling, Julia et al., Machine Learning for Alloy Composition and Process Optimization Proceedings of ASME Turbo Expo 2018, Jun. 11-15, 2018 (Year: 2018).*
Meredig, Bryce, A Brief Overview of Citrine's Data and Informatics Platform CHiMaD Meeting, May 2, 2016 (Year: 2016).*
Lundberg, Eric, Citrination Tutoral Citrine Informatics, Dec. 2017 (Year: 2017).*
Mulholland, Gregory J. et al., Perspective: Material Informatics across the product lifecycles: Selection, manufacturing and certification, Applied Materials, vol. 4, Apr. 11, 2016 (Year: 2016).*
Citrine.io Web Pages—Citrine Informatics Home Page Citrine, Jun. 12, 2017 (Year: 2017).*
Citrine.io Web Pages—Citrine Informatics Home Page Citrine, Oct. 22, 2016 (Year: 2016).*
Citrine.io Web Pages—Citrine Informatics Home Page Citrine, Mar. 31, 2016 (Year: 2016).*
Citrine Informatics, "Challenges in Machine Learning for Materials—and How to Overcome Them," Mar. 14, 2020, pp. 1-11.
Citrine Informatics, "Machine Learning Accelerates Research," Dec. 23, 2019, pp. 1-3.
Gopakimar, a. et al., "Multi-objective Optimization for Materials Discovery via Adaptive Design," Scientific Reports, Feb. 27, 2018, pp. 1-12.
Kim, Y. et al., "Machine-learned metrics for predicting the likelihood of success in materials discovery," arXiv:1911.11201v2, Nov. 27, 2019, pp. 1-13.
Koeller, J., "Visualizing Tradeoffs in Materials Design: Application to Sustainable Sourcing," Citrine Informatics Webinar, Mar. 26, 2020, pp. 1-20.
Ling, J. et al., "High-Dimensional Materials and Process Optimization using Data-driven Experimental Design with Well-Calibrated Uncertainty Estimates," arXiv:1704.07423v2, Jul. 4, 2017, pp. 1-16.
Ling, J., "Contextualized Data and Domain Knowledge Integration for Materials Informatics," Citrine Informatics, Aug. 2020, pp. 1-14.
Ling, J., "Model Interpretability for Building Confidence and Sparking Insight in Scientific Applications," Citrine Informatics, Oct. 2019, pp. 1-20.
Ling, J., "Prediction Interpretability in Data-Driven Materials Development," Citrine Informatics, Dec. 2019, pp. 1-17.
Mulholland, G. et al., "AI-driven Generative Material Design to Optimize a Component's Performance," Realize Live, Siemens, Jun. 24, 2020, pp. 1-31.
PCT International Search Report and Written Opinion, PCT Application No. PCT/IB2020/060936, dated Mar. 5, 2021, nine pages.
Peerless, J.S. et al., "Design space visualization for guiding investments in biodegradable and sustainably sourced materials," MRS Communications, vol. 10, Jan. 14, 2020, pp. 18-24.

* cited by examiner

1000

1002
receive one or more design spaces from a materials supplier, the one or more design spaces comprising candidate components available to the materials supplier, and tool capabilities of tools available to the materials supplier for manipulating the candidate components

1004
input a design space of the one or more design spaces into a machine learning model, the machine learning model trained using training data received from the materials supplier, the training data comprising a plurality of components, as well as processing parameters and/or conditions, the components including input materials and/or chemicals, and, for respective combinations of the plurality of components, a plurality of respective performance properties

1006
receive as output from the machine learning model respective predicted performances of each of a plurality of design space candidates

1008
statistically aggregate the respective predicted performances to generate a capability map of the materials supplier, the capability map being a data structure storing possible combinations of performance properties and a respective difficulty of developing a composition with that combination of performance properties, the composition being a combination of the candidate components

1010
output a user interface for display to a user indicating data of the capability map

FIG. 10

PRODUCT DESIGN AND MATERIALS DEVELOPMENT INTEGRATION USING A MACHINE LEARNING GENERATED CAPABILITY MAP

CROSS REFERENCE TO RELATED APPLICATIONS

This application claims the benefit of U.S. Provisional Application Nos. 63/041,374, filed Jun. 19, 2020, and 62/942,406, filed Dec. 2, 2019, the disclosures of which are hereby incorporated by reference herein in their entireties.

TECHNICAL FIELD

The disclosure generally relates to the field of machine learning, and more particularly relates to co-optimization of materials development and product development based a capability map derived using machine learning.

BACKGROUND

Original equipment manufacturers (OEMs) design products and parts that achieve desired outcomes in a range of dimensions, such as performance specifications, test qualifications, cost of production, manufacturability targets, and so on. As part of the design process, these OEMs simulate performance, test outcomes, and manufacturability of a product or part while varying geometry and material. OEMs may select materials from a catalogue of available materials, or may write a specification for a new material and ask their vendors to develop the desired new material. However, where a new material is desired, it may be unclear what performance specifications are achievable by a materials supplier, or which suppliers might be most capable of achieving a given performance specification. Moreover, some materials specifications might be extremely difficult for a materials developer to achieve, while others may be relatively easy for the same materials developer to achieve, though it may be unclear at the outset what the level of difficulty is. Because the OEM lacks the data on how difficult various materials specifications are for a given materials vendor to achieve through new materials development, the OEM cannot efficiently co-optimize the part performance with the materials specifications.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of an environment for interfacing a user and a materials supplier with design space evaluation service 130.

FIG. 10 is an exemplary flowchart of a process for generating a capability map.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes generating a capability map. In an embodiment, a system receives training data from a materials supplier, the training data including a plurality of components, the components including materials and/or chemicals, and the components possibly including a plurality of processing steps and/or parameters. The training data, for each respective component, may also include a plurality of respective performance properties. The system receives one or more design spaces from the materials supplier, the design spaces comprising components available to the materials supplier and tool capabilities of tools available to the materials supplier for manipulating the materials and chemical ingredients.

The system trains the machine learning model using the training data to take as input a design space for the materials supplier, and to output materials performance predictions which can be statistically aggregated into capability map of the materials supplier. The capability map may be a user interface driven by a data structure storing a difficulty of developing materials and/or chemicals having a given set of performance properties.

Design Space Evaluation Service

Figure 1:
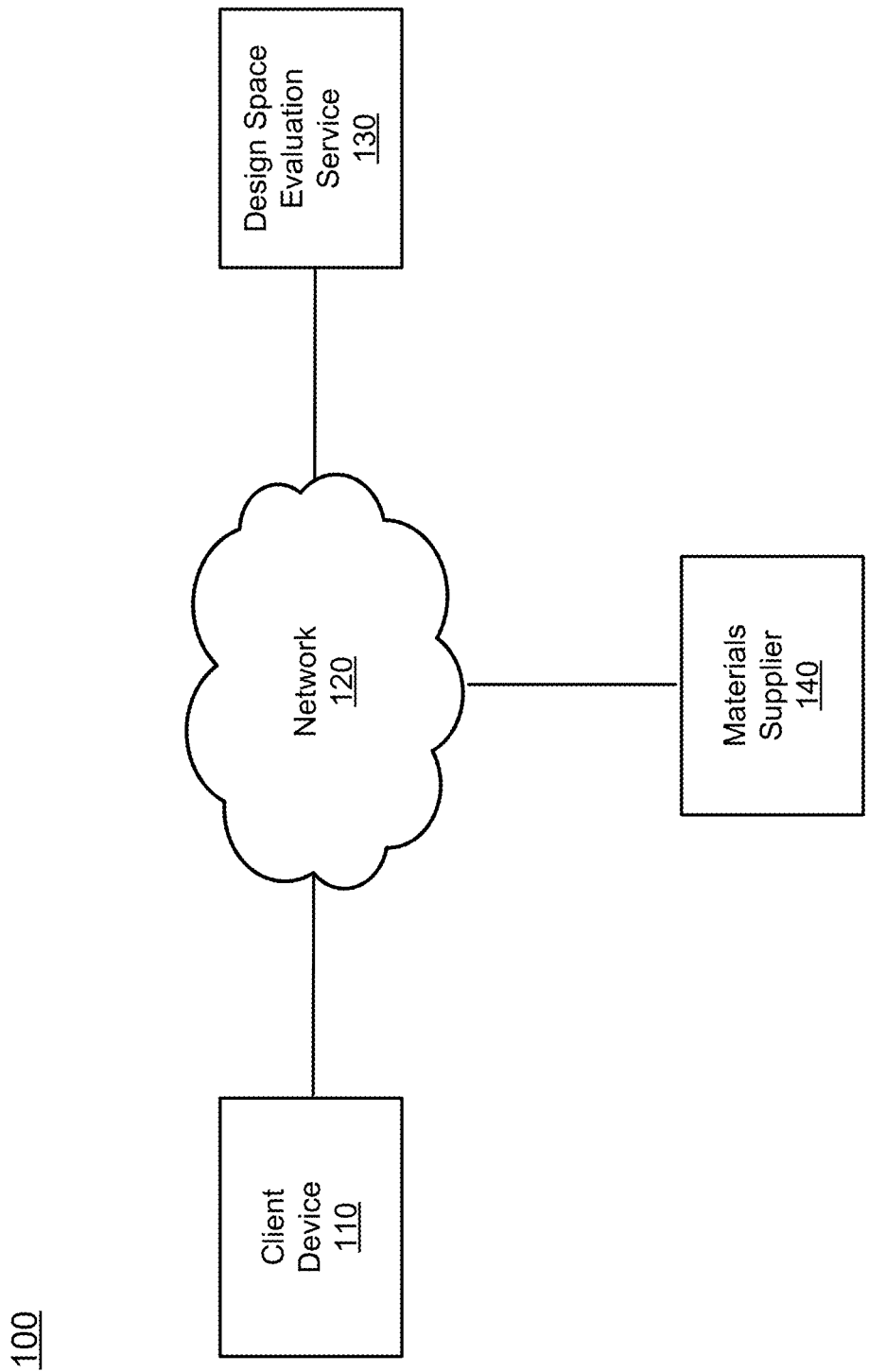

Figure (FIG. 1 illustrates one embodiment of an environment for interfacing a user and a materials supplier with design space evaluation service 130. FIG. 1 includes client device 110, network 120, design space evaluation service 130, and materials supplier 140. Client device 110 may be operated by any user wishing to evaluate capabilities of materials supplier 140 with respect to a desired specification. In an embodiment, client device 110 is operated by an original equipment manufacturer (OEM) that is exploring a new design specification. Client device 110 inputs desired specifications into a user interface (the user interface and design space particulars are discussed below with respect to FIGS. 2-7), and those parameters are transmitted over network 120 (which may be any network, such as the Internet) to design space evaluation service 130. Client device 110 may select materials supplier 140 from several candidate materials suppliers, and may select more than one materials supplier.

Separately, materials supplier 140 transmits training data to design space evaluation service 130. The training data includes a plurality of components that include input materials and/or chemicals as well as processing setpoints and/or conditions, and, for respective combinations of the plurality of components, a plurality of respective performance properties. Design space evaluation service 130 uses the training data to train one or more machine learning models to take new design spaces as input, and to output predicted performance properties which can be statistically aggregated into a capability map. Thus, where materials supplier 140 provides to design space evaluation service 130 a new design space, design space evaluation service 130 is able to input the new design space into the trained model, and output capabilities of the design space for consumption by the user of client device 110. Design spaces each include a subset of relevant candidate components (e.g., materials and/or chemicals) available to materials supplier 140, as well as tool capabilities of tools available to materials supplier 140 for manipulating the candidate components.

Design space evaluation service 130 provides the capability map to client device 110. Client device 110 may then input the desired specifications into the capability map, and may view likelihoods of success of materials supplier 140 being able to manufacture a material that satisfies the desired specifications. This helps, e.g., inform an OEM as to what materials suppliers are likely to succeed in hitting desired specifications.

Figure 2:
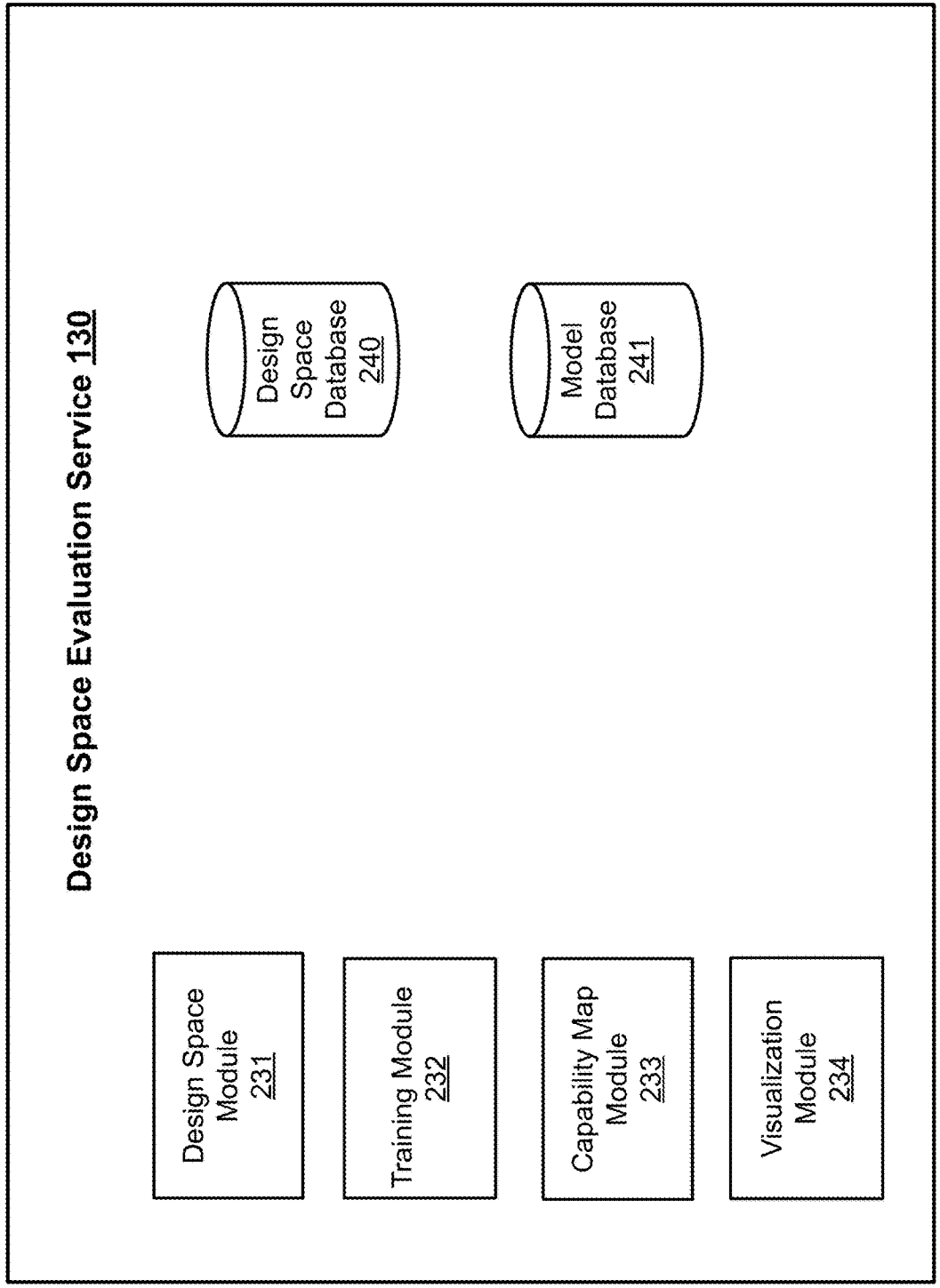
FIG. 2 illustrates one embodiment of exemplary modules and databases of design space evaluation service 130.

FIG. 2 illustrates one embodiment of exemplary modules and databases of design space evaluation service 130. As depicted in FIG. 2, design space evaluation service 130 includes design space module 231, training module 232, capability map module 233, and visualization module 234, as well as design space database 240 and model database 241. The modules and databases depicted in FIG. 2 are merely exemplary; fewer or more modules may be used to achieve the functionality described herein.

Design space module 231 receives design space information from materials suppliers (e.g., material supplier 140). The term design space, as used herein, may refer to a collection of candidate materials including one or more candidate components available to a materials supplier and tool capabilities of tools available to the materials supplier for manipulating the candidate components. The components may include chemicals, materials, or some combination thereof. The tools may include any industrial equipment, such as mixing equipment, heating equipment, smelting equipment, and the like. These design spaces may encompass some subset of the parameter space of materials the supplier could manufacture given specified constraints. A design space may include variation of material synthesis, structure, composition and processing. An example design space for a paint formulations company could include all of the various combinations of available binder, solvent, pigment, and additives in the ratios allowable by their formulation processes. Another example design space for a paint formulations company could include the various combinations of available binder, solvent, pigment, and additives in the ratios allowable by their formulation processes for which the total recipe cost is below a specified threshold. Another example design space could be a subset of the previous design space with a limited number of candidate paint formulations sampled from the larger set of possibilities.

Design space module 231 may receive design space information from multiple material suppliers and may store this information in design space database 240. Design space module 231 may periodically, at various time intervals receive, or when design space information changes, either through a push or pull mechanism, updated design space information from the materials suppliers, thus ensuring design space module 231 maintains current design space information in design space database 240.

Training module 232 trains one or more machine learning models to take a design space as input, and to output a material performance for each candidate within the design space. In order to train the machine learning model(s), training module 232 receives training data from each materials supplier. The training data includes components, such as input materials and/or chemicals. The training data also includes, for respective combinations of the plurality of components, a plurality of respective performance properties. The training data may include additional information, such as indicia of how the combinations were made (e.g., indicia of the tools used and parameters of how the tools were used (such as amount of heat applied for how long, etc.)).

After training a given model, training module 232 stores the model in model database 241. Training module 232 may receive updated training data and may augment training of a given model periodically to improve the accuracy of that model. Design space evaluation service 130 may train different machine learning models for different materials suppliers. The trained model is trained to predict materials performance, i.e. the materials properties of interest (including, but not limited to: electrical, mechanical, thermal, and optical properties), as a function of, e.g., the material composition, structure, synthesis, and processing. The model is trained to be fit to existing data that include varying material composition and processing, and the associated material performance. The model is also trained to estimate the uncertainty associated with each prediction. In other words, for each prediction the model is able to express the distribution over which the model predicts the true material property for the given composition and processing. The model may include some combination of one or more machine learning models and/or analytical formulae. The machine learning algorithms may include, for example, random forest regressors, Gaussian process regressors, support vector machines, and/or neural networks.

Capability map module 233 receives a design space from a materials supplier (e.g., materials supplier 140), and inputs the design space into the machine learning model. Capability map module 233 receives, as output from the machine learning model, the predicted performances of the candidates in the design space and the estimated uncertainty associated with each prediction. The predicted material properties and uncertainties of each candidate in the design space are then statistically aggregated into a capability map. As used herein, the term capability map may refer to the aggregated performance of a catalog of materials not yet created, but which potentially could be created if demand existed. The capability map indicates a likelihood that a given design space contains materials whose properties extend into any given point in an n-dimensional material property space (interchangeably referred to herein as an "output space"). Likelihood here refers to a measure of confidence that a given specification can be achieved using the given design space, and/or it may represent a measure of difficulty of achieving a given specification using the given design space. During statistical aggregation, the predicted material properties and uncertainties of all candidates in the design space are combined to provide the likelihood for every point in output space through the use of design space metrics. In an embodiment, statistical aggregation may be done using a design space metric such as the Maximum Joint Probability Density (MJPD), which indicates a probability of reaching a given region in output space given the best candidate in the design space. In an embodiment, a statistical aggregation may be done using a design space metric such as Summed Probability Density (SPD), which gives a predicted density of candidates in the output space. Other design space metrics also exist. In general, these metrics serve to aggregate the predictions over a design space and use that aggregation to estimate the likelihood for each point in output space. Further detail on MPJD, SPD and other metrics are described below.

Capability maps enable OEMs to co-optimize product performance with material specifications while taking into account the achievability of various materials specifications. This is done without giving access to OEMs to materials supplier data on composition and processing, which is often highly proprietary. In order to safeguard the proprietary data, training module 232 may discard training data after it is used to train a machine learning model for a given materials supplier. Capability maps enable OEMs to determine achievability of a given materials performance target before developing that material, which reduces cost, time, and materials required to develop a material with the desired performance. Thus, the capability map enables the OEM to take control of the tradeoff between material performance and cost/lead-time for developing that material.

Visualization module 234 generates for display (e.g., on client device 110) a visual representation of the capability map. The visualization may be generated using any of a number of candidate metrics. In an embodiment, a metric may be the Visualization module 234 may visualize these metrics using two-dimensional contour plots, where materials of interest are on the x and y axes, and the SPD or MJPD metrics are used to color the contours. Examples of this are described in further detail below with respect to FIGS. 6-8.

The metrics incorporate a similar treatment of candidates and their predicted properties. Each output is described as a random variable $T_k$ with probability density $\varphi_k$. In an embodiment, the random variable will be distributed according to a normal distribution: $T_k \sim N(\mu_k, \sigma_k^2)$. In another embodiment, the random variable will be distributed according to other distributions, including multi-modal distributions. Because multiple objectives are of concern, a candidate with d>1 objectives may be defined as a set of random variables with a joint distribution $\rho$: $C=\{T_k\}_{k=1}^d \sim \rho$. In an embodiment, an assumption in these approaches is that the objectives are independent of one another, such that the joint probability density can be calculated from: $\varphi_c = \Pi_{k=1}^d \varphi_k$. This, however, can be a poor assumption in some cases where outputs are co-variant. Despite this simplification, the resulting capability map is nevertheless useful for understanding which regions of output space are achievable with a given design space. In another embodiment, objectives are not assumed to be independent of one another, such that the joint probably density cannot be factored into a product of marginal probability densities.

In an embodiment, visualization module 234 treats a design space of n candidates as a set of candidates, each being a set of random variables, each with its own distribution described by the objectives' means and uncertainties $D=\{C_i \sim \rho_i\}_{i=1}^n$. The MJPD takes the maximum value of the joint probability density for each gridded point in output space, $t^0$, over all n candidates in the design space, D: $MJPD_D(t^0) = \max_{1 \le i \le n} \varphi_{c_i}(t^0)$. The MJPD metric thus provides the value of the joint probability density for the candidate most likely to achieve the property values at a given point in output space.

Visualization module 234 may use SPD to sum the joint probability density over all n candidates at a given point in output space:

$$SPD_D(t^0) = \frac{1}{n}\sum_{i=1}^{n} \varphi_{C_i}(t^0).$$

The resulting capability map thus enables visualization module 234 to indicate density of design space predictions in the output space, factoring in the uncertainty of these predictions.

When outputting an MJPD plot, visualization module 234 may indicate within the plot whether the current data and model suggests that a region of performance space is attainable by any single candidate in the design space. When outputting a SPD plot, visualization module 234 may indicate how easy it is to find a candidate in any given region of performance space. Other metrics are also possible. For example, visualization module 234 may multiply the SPD by the number of candidates in the design space to yield a candidate number density, which provides information about how many candidates are expected to have performance in a given region. Other metrics used by visualization module 234 may include the Number of Likely Candidates (NLC) which at each point in the performance space is the number of candidates within one standard deviation with respect to their individual predictive distributions, and the Fraction of Likely Candidates (FLC) which is the fraction of candidates within one standard deviation with respect to their individual predictive distributions.

Other possible metrics, such as the Cumulative Likelihood of Improvement (CLI), evaluate the probability that the design space contains at least N materials with specified performance. Similarly, the Predicted Fraction of Improved Candidates (PFIC) is the fraction of candidates whose performance is predicted to exceed each point in materials property space. Any of these metrics may be used, individually or in combination, to build a visual representation of a capability map by visualization module 234.

In an embodiment, rather than generate a visualization of the capability map, design space evaluation service 130 may train the machine learning model to directly to predict the performance of specific materials or chemicals given their synthesis, composition, structure, and processing. Based on these ML predictions, the OEM can determine which candidate material(s) in the design space is/are predicted to be closest to hitting a desirable material performance specification. This is further described with respect to FIG. 4.

Figure 3:
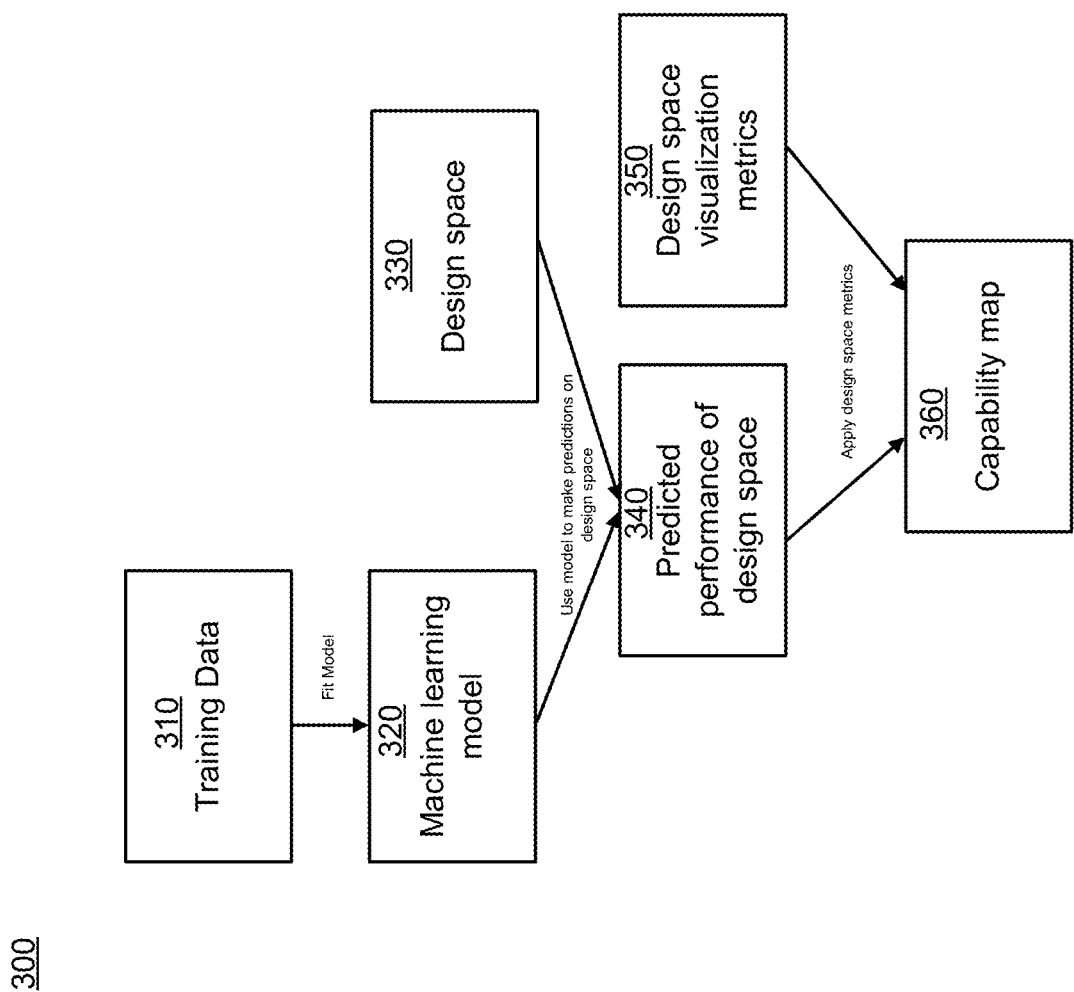
FIG. 3 illustrates an exemplary data flow for generating a capability map.

FIG. 3 illustrates an exemplary data flow for generating a capability map. Workflow 300 begins at 310, where training module 232 receives training data and uses the training data to fit machine learning model 320. Capability map module 233 receives design space 330 from a materials supplier 140

(e.g., by retrieving design space 330 from design space database 240, or by receiving design space 330 directly from materials supplier 140), and inputs design space 330 into machine learning model 320 to yield predicted performance of the design space 340. The predicted performance of the design space 340 (that is, raw data forming a capability map) is applied to design space visualization metrics 350 to yield capability map 360 (e.g., using visualization module 234).

Figure 4:
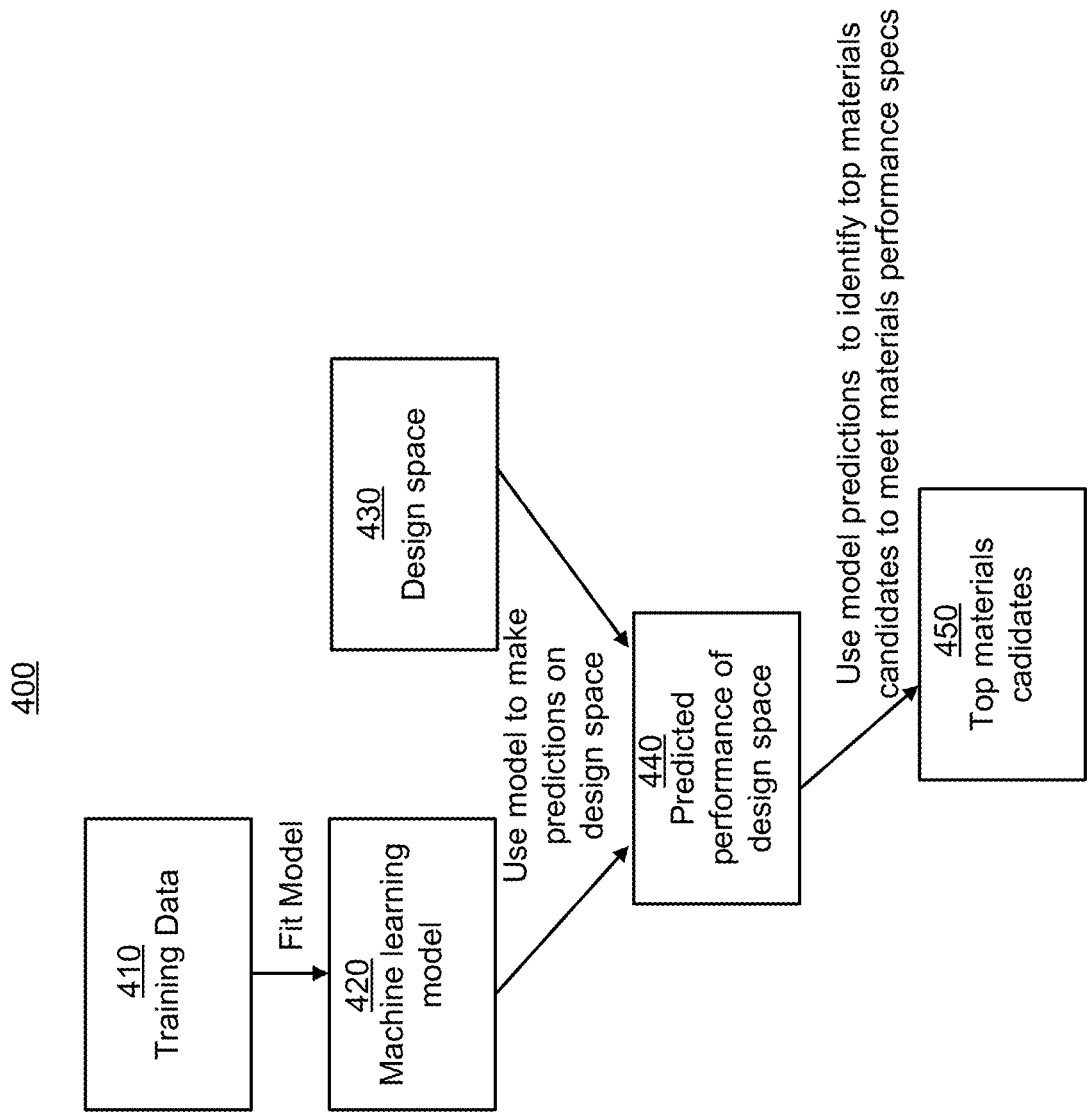
FIG. 4 illustrates an exemplary data flow for identifying top materials candidates to meet materials performance specifications.

FIG. 4 illustrates an exemplary data flow for identifying top materials candidates to meet materials performance specifications. Data flow 400 begins with training data 410 being used to train and fit machine learning model 420. Design space 430 (e.g., as received from materials supplier 140) is input into machine learning 420. Capability map module 233 obtains a predicted performance of the design space 440. Separately, design space evaluation service 130 may have received input of desired performance specifications from client device 110. Rather than, or in addition to, having the user of client device 110 navigate a visual representation of a capability map, design space evaluation service 130 may compare the predicted performance of the design space 440 to the desired performance specifications, and may, based on the comparison, identity top materials candidates 450. The identified top materials candidates 450 may be shown using visualization module 234, and may include indicia of likelihood of success of achieving each of, and/or all of, the desired performance specifications.

Figure 5:
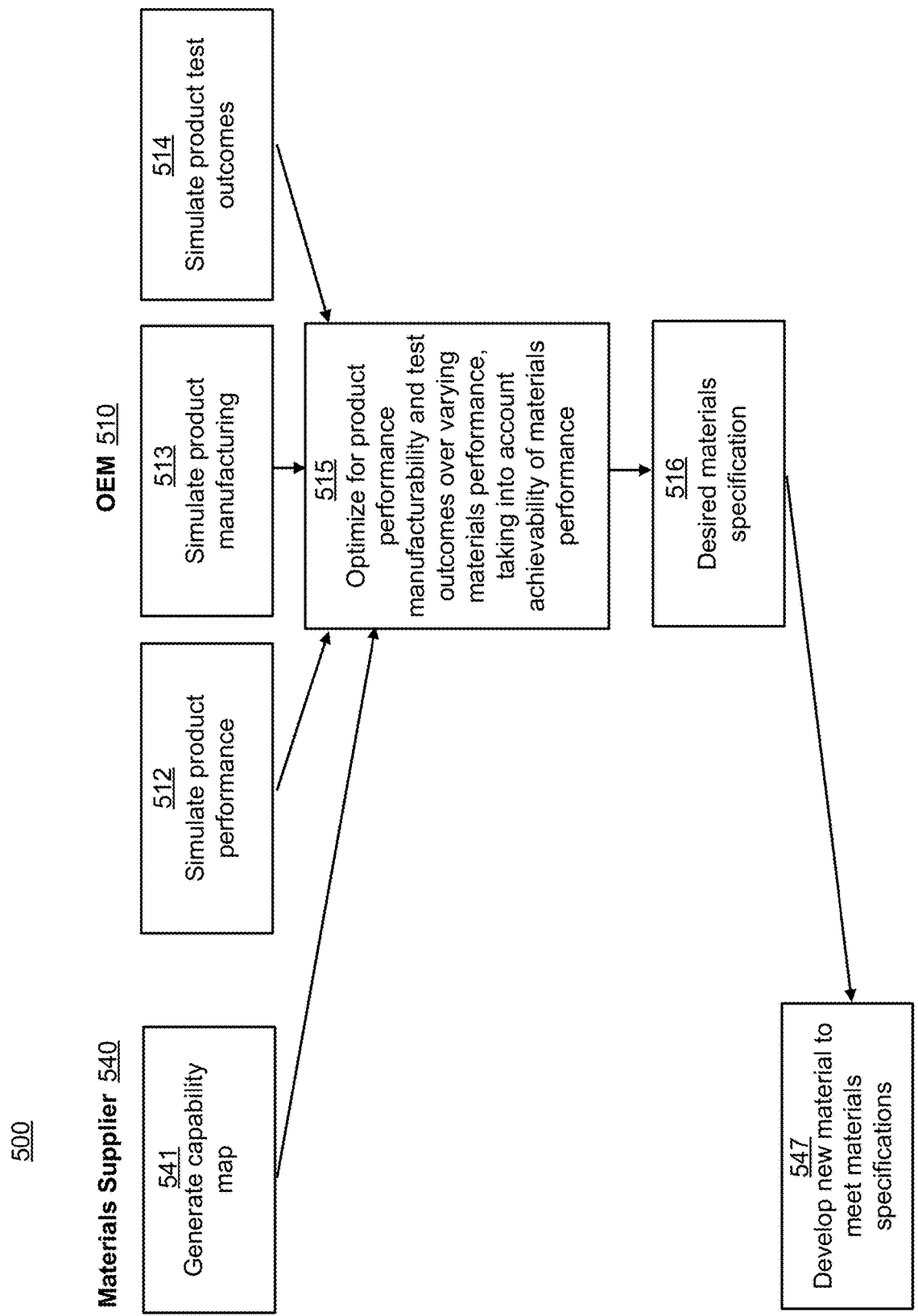
FIG. 5 depicts exemplary activity by both a materials supplier and an OEM to achieve development of new material to meet materials specifications.

FIG. 5 depicts exemplary activity by both a materials supplier and an OEM to achieve development of new material to meet materials specifications. As depicted in scenario 500, design space 130 generates a capability map based on information (e.g., training data and design space information) received from materials supplier 540 (which carries the same weight of description of materials supplier 140). Using design space evaluation service 130, OEM 510 is able to simulate the viability of a given product (that is, a product having desired specifications that OEM 510 provides as input to design space evaluation service). For example, OEM 510 is able to simulate product performance 512 (that is, the likelihood that, if a product is generated, it would meet each specification input by OEM 510), simulate product manufacturability 513 (that is, the likelihood that a given combination of components is manufacturable), and simulate product test outcomes 514.

Based on the results of the simulations and the capability map, OEM 510 is able to co-optimize its simulations with the capabilities of materials suppler 540 without materials supplier 540 having to hand over to OEM 510 proprietary details. That is, OEM 510 applies the results of the simulations to the capability map, optimizing 515 for product performance, manufacturability, and test outcomes over varying materials performance, taking into account achievability of materials performance. OEM 510 is then able to select a desired materials specification 516 (e.g., by selecting the materials specification based on a visual representation provided by visualization module 234). In an embodiment, design space evaluation service 130 transmits a command 547 to materials supplier 540 to develop a new material to meet the selected materials specifications.

Figure 6:
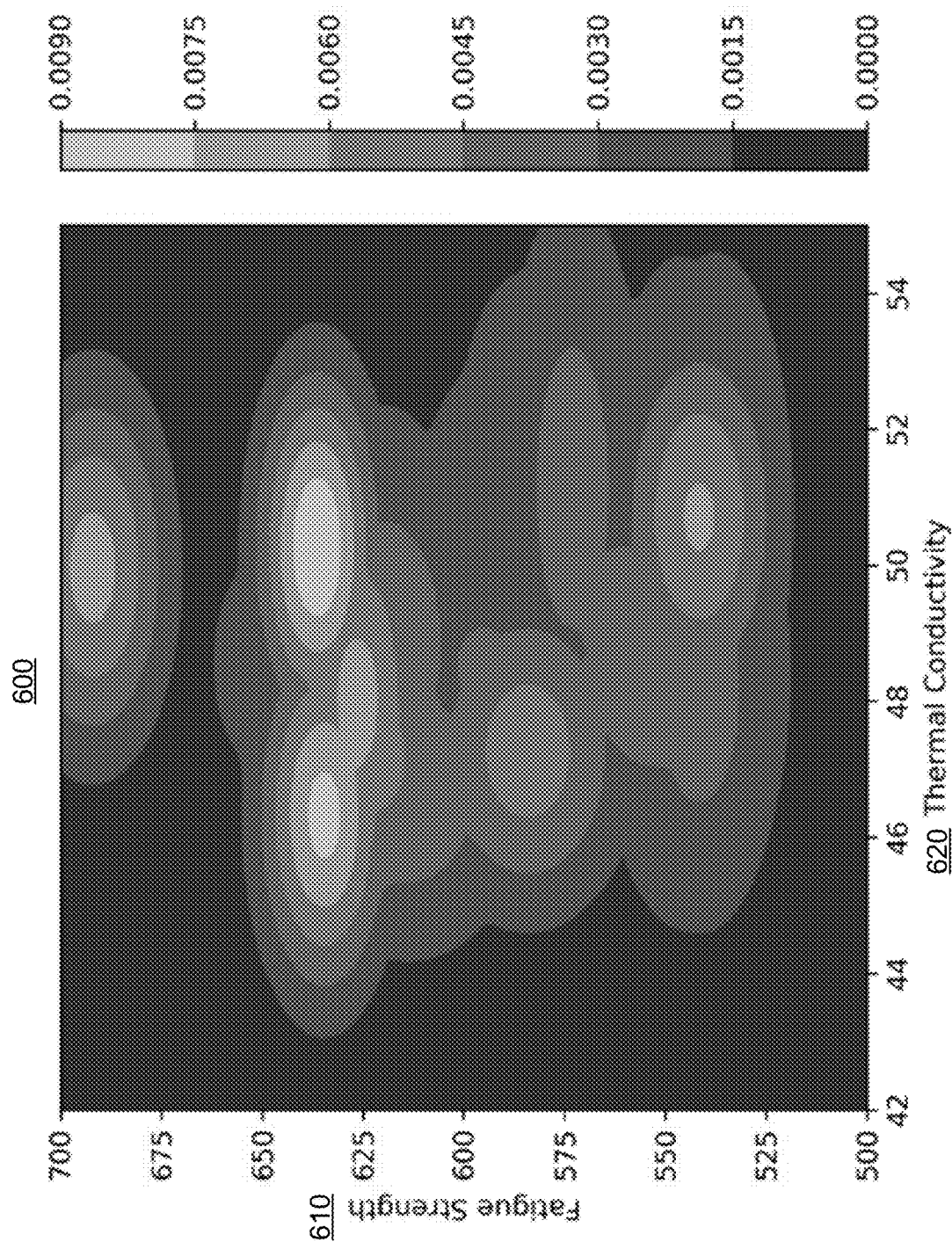
FIG. 6 depicts an exemplary representation of a capability map using user-selected dimensions.

FIG. 6 depicts an exemplary representation of a capability map using user-selected dimensions. User interface 600 depicts a visual representation of a capability map generated to represent capabilities of a design space of a materials supplier 140. User interface 600 may be generated for display by client device 110 (e.g., to an OEM). User interface 600 may be rendered by a dedicated application installed to client device 110, or may be rendered by a browser operated by client device 110 that is retrieving information from design space evaluation service 130. User interface 600 may show a two-dimensional graphical depiction of any metric, with y-axis 610 and x-axis 620 corresponding to any parameter selected by the user. The manner in which the user may select parameters for the axes is described with respect to FIG. 7 below. The metric guiding the graphical representation in FIG. 6 may also be configured by the user.

Figure 7:
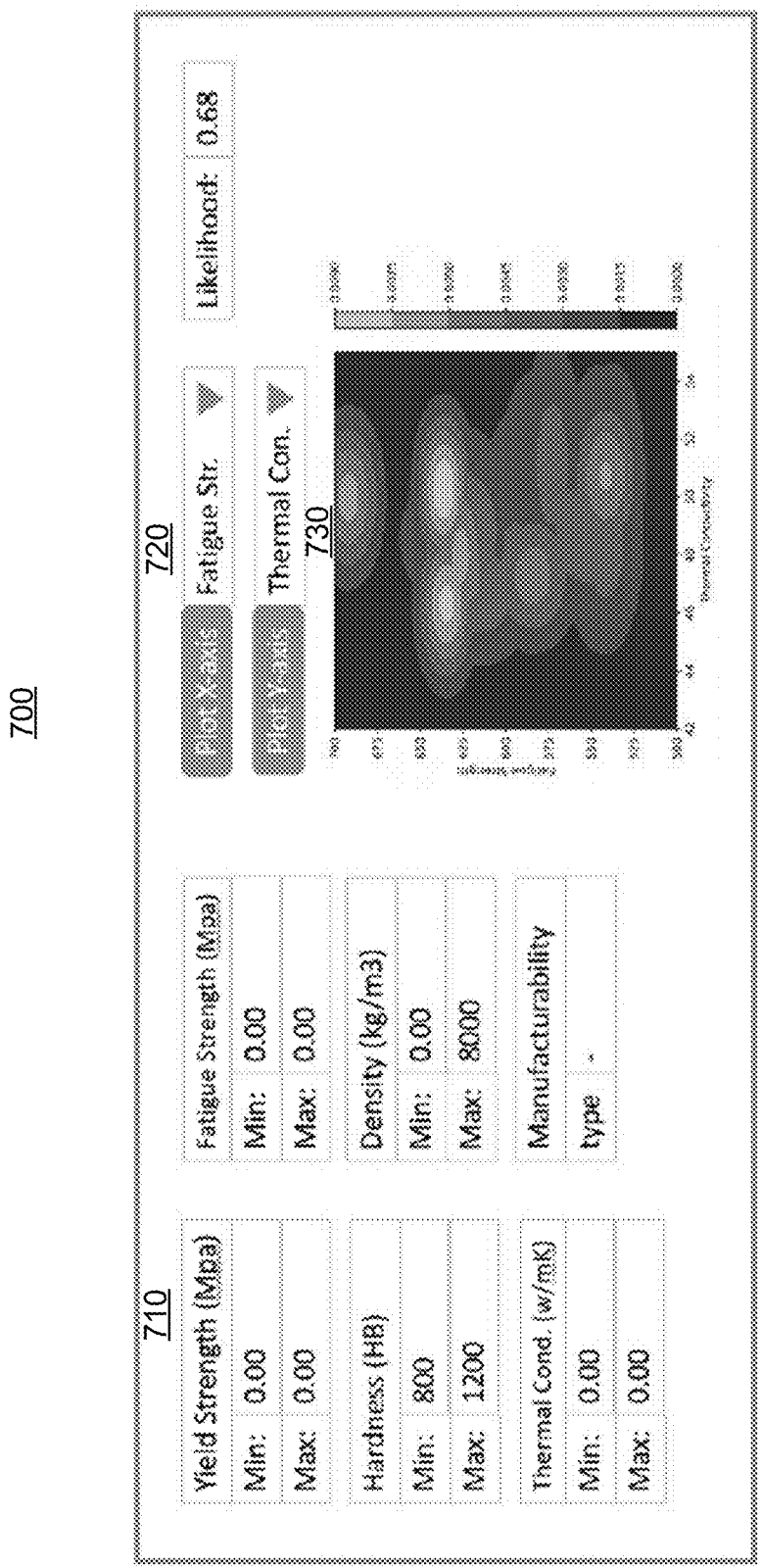
FIG. 7 depicts an exemplary user interface for configuring a representation of a capability map.

FIG. 7 depicts an exemplary user interface for configuring a representation of a capability map. User interface 700 includes specification options 710, axes options 720, and visual representation 730. Specification options 710 include selectable options to designate parameters (e.g., yield strength, hardness, fatigue strength, and so on) by a user of client device 110. Specification option 710 also include selectable options to designate requirements with respect to those parameters (e.g., minimum and maximum values, types, and so on). Axes options 720 include selectable options for the user of client device 110 to select which parameters will dictate the X and Y axes of visual representation 730. Visual representation 730 acts in a manner similar to that described with respect to user interface 600 of FIG. 6.

Figure 8:
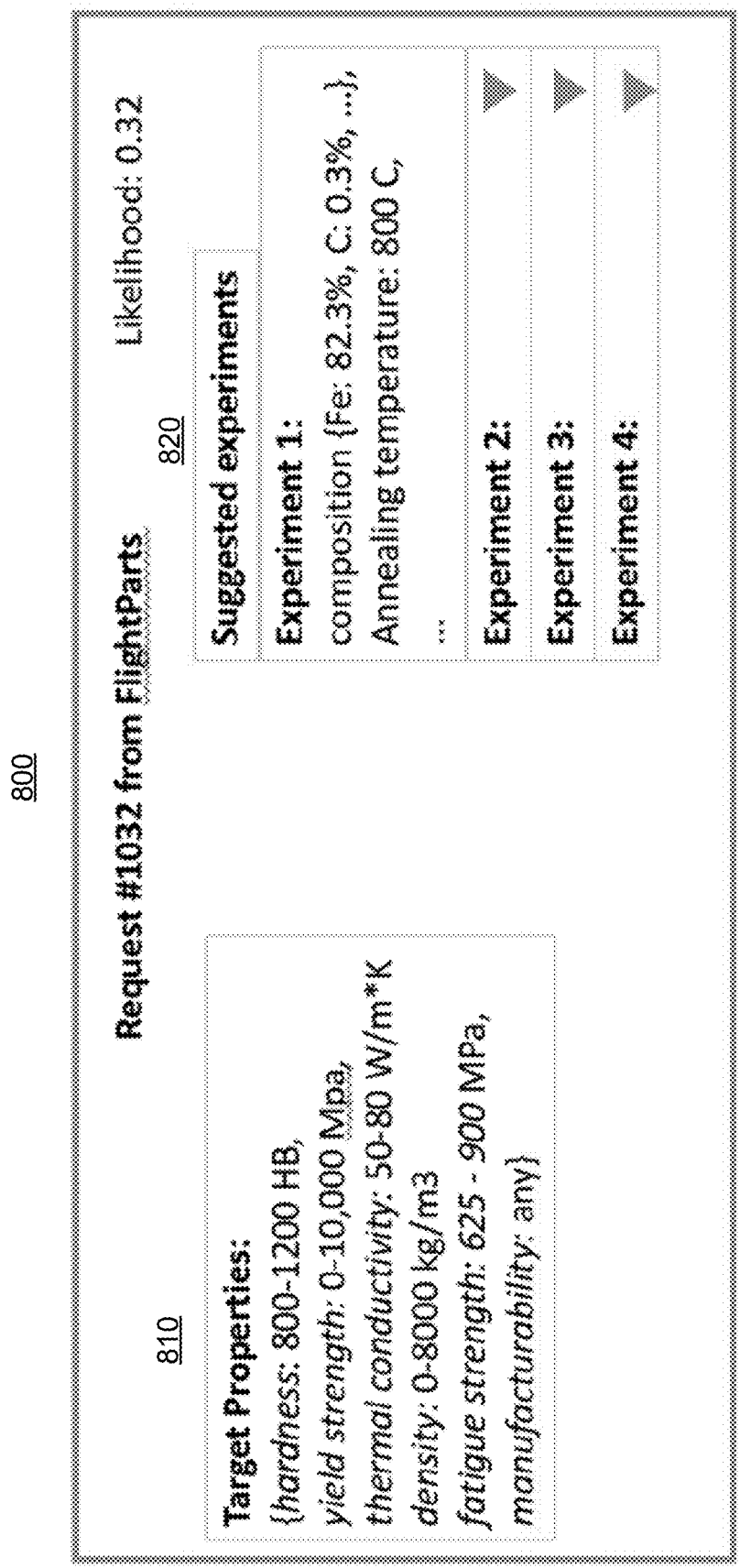
FIG. 8 depicts an exemplary user interface facing a materials supplier based on experiments corresponding to selections of material properties by the OEM.

FIG. 8 depicts an exemplary user interface facing a materials supplier based on experiments corresponding to selections of material properties by the OEM. FIG. 8 depicts user interface 800, having target properties 810 and suggested experiments 820. In an embodiment, the user of client device 110 manually populates target properties 810 and/or suggested experiments 820. In an embodiment, design space evaluation service 130 automatically populates target properties 810 and/or suggested experiments 820 based on input from the user and/or top candidates identified by design space evaluation service 130. Target properties 810 may indicate the values input by the user into specification option 710 (e.g., ranges and/or types of values). Design space evaluation service 130 may populate suggested experiments 820 by identifying combinations of components that are most likely to yield a material that satisfies target properties 810 from the capability map. Design space evaluation 130 identifies the most likely components based on, e.g., the uncertainty scores indicated in the capability map.

Figure 9:
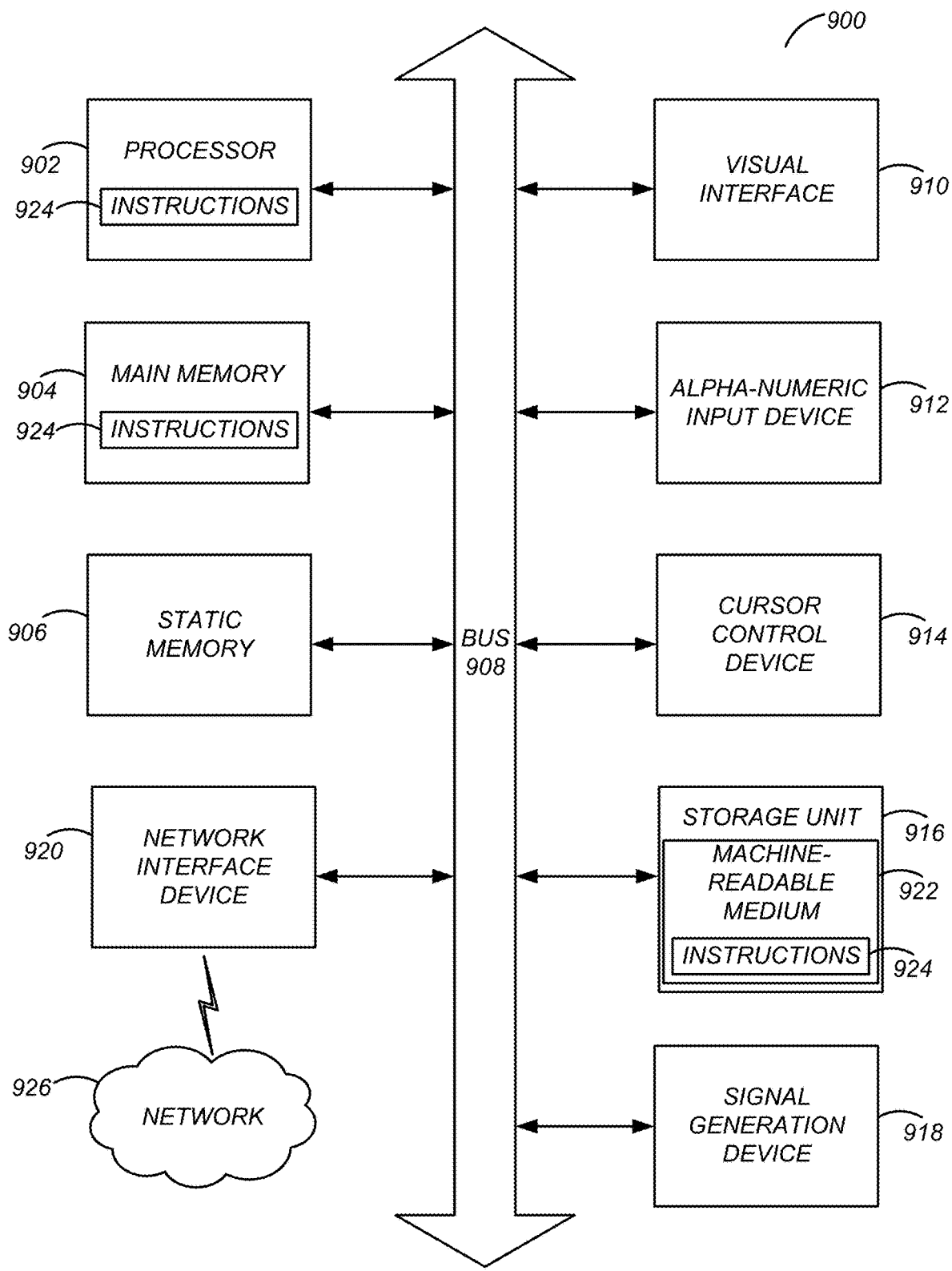
FIG. 9 is a block diagram illustrating components of an example machine able to read instructions from a machine-readable medium and execute them in a processor (or controller).

FIG. 9 is a block diagram illustrating components of an example machine able to read instructions from a machine-readable medium and execute them in a processor (or controller).

FIG. 10 is an exemplary flowchart of a process for generating a capability map.

Process 1000 begins with design space evaluation service 130 receiving 1002 one or more design spaces from a materials supplier, the one or more design spaces comprising candidate components available to the materials supplier, and tool capabilities of tools available to the materials supplier for manipulating the candidate components. This receiving may be performed by design space module 231.

Design space evaluation service inputs 1004 a design space of the one or more design spaces into a machine learning model, the machine learning model trained using training data received from the materials supplier, the training data comprising a plurality of components, the components including input materials and/or chemicals, and, for respective combinations of the plurality of components, a plurality of respective performance properties. The model may be retrieved from model database 241. The model may be trained using training module 232. The training data may include at least one of a plurality of processing elements (e.g., properties, tools used to manufacture, etc.) and a plurality of processing parameters (e.g., minimum and maximum values, types, capabilities of tools (e.g., heat achievable by given tool), etc.).

Design space evaluation service 130 receives 1006 as output from the machine learning model respective predicted values for each material property as well as the uncertainty measure associated with each predicted value, of each of a plurality of design space candidates. Design space evaluation service 130 statistically aggregates 1008 the respective predicted performances of each candidate in the design space to generate a capability map of the materials supplier, the capability map being a data structure storing possible combinations of performance properties and a respective difficulty of developing a composition with that combination of performance properties, the composition being a combination of the candidate components. The capability map may be generated and/or stored using capability map module 233.

Design space evaluation service 130 outputs 1010 a user interface for display to a user indicating data of the capability map. Design space evaluation service 130 may generate the user interface using visualization module 234. In an embodiment, the capability map is in a space comprising three or more dimensions, wherein the user interface comprises a selectable option to select two properties of interest, and wherein responsive to receiving a selection of the two properties of interest, outputting a graph showing levels of achievability in two dimensions corresponding to the two properties of interest. In another embodiment, the capability map is in a space comprising any number of dimensions where the user can query the likelihood by entering the target range in each of those dimensions and receive back a numerical metric corresponding to the achievability in those n-dimensional target ranges. It is then possible to conduct mathematical operations on these capability maps, such as, but not limited to, integrating over these metrics to filter out one of the dimensions, or subtracting one capability map from another to highlight areas where there are large differences between the design spaces, or applying maximum or minimum functions across multiple capability maps to combine multiple capability maps into one.

In an embodiment, an application programming interface enables a program to query the capability map automatically, returning the likelihood of achieving output properties to the program. An application for this is for OEMs to optimize part design using modeling and optimization software while constraining the optimization within a particular level of likelihood of achieving specific material properties.

Exemplary Use Case—Steel Alloy

To set the stage for an exemplary use case, we introduce a fictional character Rosa the Researcher, who works at a materials company AlloysX. Rosa is a materials researcher and helps AlloysX develop new materials. We also introduce the fictional character Derek the Designer, who works at an OEM called FlightParts. Derek is responsible for the design of a new widget at FlightParts.

Derek the Designer has been told to design a widget that will go into a new design of an aircraft engine that his company, FlightParts, is working on. This widget will be near a hot part of the engine, be load-bearing and has another part that slides over it constantly during engine operation. The part therefore needs to be high performance, and requires (1) high thermal conductivity to remove away heat generated by the engine, (2) great fatigue strength to bear with cycling loads found in the engine, and (3) be of high hardness to be able to withstand another part sliding over it continuously, and (4) be as light-weight as possible. Derek knows that he can improve conductivity and fatigue strength by making the part thicker, but this then greatly increases the weight of the part and is ultimately undesirable. If he could find strong and light materials that are also high hardness and have good thermal properties, the part could be designed much better.

Without the benefit of design space evaluation service 130, Derek would go through a laborious and inefficient process. Derek would see what materials are currently available to him. He will go to his Procurement department and ask them for the catalogues he has on file from all their suppliers. Procurement hands over the AlloysX catalogue of materials. Derek goes through this list of hundreds of materials, but does not find the perfect material, although he does find one that might work if he adjusts the design for it. Derek now has two options: 1. He uses this adequate material and designs around its limitations by adjusting the geometry of the part. 2. He works with Paul to put out a Request for Proposal (RFP) to make a new material that is ideally suited for Derek's application. However, this process is long, indirect, and Derek has no idea what material specs are reasonable enough to put in the proposal. Plus, when Rosa as part of AlloysX comes across this RFP there is no framework by which she can quantify how achievable the request is, other than her using her expert judgement. Not having a quantitative sense of achievability, it is very difficult to accurately price the materials development process. There are weeks of back-and-forth communication, with tedious analysis by both parties, until a set of target material properties and contract cost are even decided upon. Only then does progress towards a new material begin, and waste in resources occurs in undue consumption of raw materials, electricity, and so on toward failed experiments.

Using the systems and methods disclosed herein, design space evaluation service 130 trains one or more machine learning models for AlloysX based on training data provided by AlloysX. Design space evaluation service 130 receives a design space from Rosa and generates a capability map for AlloysX that Derek can explore to figure out what properties he wants to aim for. He can quantify how hard it might be to achieve certain properties and can therefore make an informed decision on how much of a moonshot he is willing to make the project. Derek will then communicate his ideal properties (e.g., via design space evaluation service 130) to Rosa and the rest of the AlloysX team.

The advantages are not only prevalent to an OEM, but are also prevalent to materials supplier 140. Where AlloysX is the materials supplier 140, Rosa has experimental data on about 450 steel alloys, including their composition, process parameters and output properties (hardness, yield strength, thermal conductivity, density, fatigue strength, etc.). In general, these output properties can include mechanical properties, thermal properties, optical properties, electrical properties, chemical, or other properties. Rosa takes the data that she has from her experiments and simulations for steel alloys and creates a predictive machine learning model using design space evaluation service 130 as discussed above. Rosa then takes other candidates in her design space (i.e. other steel that she could make with various alloy compositions and processing parameters) and using design space evaluation service 130, makes predictions on them on all, for each of the six material properties. These predictions are probability distributions; predicting the correct value with 100% accuracy may not be feasible, but design space evaluation service 130, using machine learning models with quantified predictive uncertainty, estimates the range where the true value is most likely to fall given the available data.

From these predictions with uncertainty estimates, the design space evaluation service 130 generates a capability map, which can be shared with AlloysX's customers (e.g., client device 110) via the design space evaluation service 130. Rosa might repeat this entire process for different design spaces. For example, she might create a capability map for aluminum alloys, or for steel alloys that do not use any chromium, or any other set of experiments that she thinks might make sense.

Following this example, an example point in a capability map might show that, at point: {hardness: 800 HB, yield strength: 580 Mpa, thermal conductivity: 90 W/m*K, density: 8023 kg/m3, fatigue strength: 230 MPa, manufacturability: good}, the MPJD is 0.08. The example might show values for any other metric discussed herein. Importantly, at each point in the output space, no information on how these material properties is achieved is included, thus protecting the proprietary data of the materials supplier by anonymizing the recipe but providing material performance information to client device 110.

Mathematical operations can be done on the capability map. For instance, Derek does not care about yield strength, so Derek can command design space evaluation service 130 to integrate the MPJD over all possible yield strength values to factor the yield strength out. Any other operation might also be applied. One may integrate over some dimensions until only two dimensions are left to be able to visualize the remaining dimensions and analyze trade-offs; in some embodiments, the two-dimensional visualizations disclosed herein are derived using such operations.

To further exemplify the advantages of the systems and methods disclosed herein, we step through an end-to-end workflow for both Derek and Rosa, beginning with Derek. Derek logs in to a portal of AlloysX that connects to design space evaluation service 130, and goes to the capability map for steels (e.g., a capability map corresponding to the visualization shown in FIG. 7). Derek starts investigating and fills out the hardness and the density requirements (e.g., in specification options 710. He notices that as he puts in more restrictive requirements, the achievability metric begins to drop. Also, Derek enters the X and Y axis so that he can easily explore the trade-offs in risk that his target specifications might take a significant time to achieve, or may not even be achievable at all. Derek enjoyed an improved user interface that enabled him to browse through not just existing AlloysX materials, but also new potential materials that AlloysX could develop. Derek is also happy that he didn't have to get on a phone with AlloysX's sales team and to slowly get information about what new materials they could develop, and how achievable those targets would be. That process usually takes weeks, with sales having to check with their technical teams to get an answer. And even then, the technical teams were rarely able to give a clear answer about how feasible a set of properties are.

With respect to Rosa's workflow, Rosa receives a notification saying that a new material request has been entered from design space evaluation service 130. Rosa logs into the design space evaluation service 130 and goes to a page corresponding to the request (e.g., the page depicted in FIG. 8). Rosa is confers with Derek about the project and negotiates terms for proceeding with experimentation. Rosa's use of a quantitative, data-driven framework of design space evaluation service 130 reduces experimentation, preserving resources that would otherwise go to wasteful and unfruitful experimentation. Rosa may use design space evaluation service's machine learning models to suggest which experiments should be run next to most quickly hit Derek's materials performance targets (e.g., top materials candidate recommendations described with respect to FIG. 4).

Computing Machine Architecture

FIG. (FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 910 may include or may interface with a touch enabled screen. The computer system 900 may also include alpha-numeric input device 912 (e.g., a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for using machine learning to generate a capability map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a capability map, the method comprising:
  receiving, by a server including a processor, using a communications network, from a client device of a materials supplier, one or more design spaces, the one or more design spaces comprising:
    candidate components comprising materials and/or chemicals available to the materials supplier, and
    tool capabilities of tools available to the materials supplier for manipulating the candidate components, wherein the manipulating comprises at least one of physically or chemically processing one or more of the candidate components;
  inputting, by the server, at least one design space of the one or more design spaces into a machine learning model, the machine learning model trained using training data received from the materials supplier, wherein the training data comprises historical data representative of combinations of components produced by the materials supplier using one or more of the tools, the training data comprising:
    a plurality of input materials and/or chemicals,
    a plurality of processing parameters relating to use of one or more of the tools in processing the input materials and/or chemicals,
    and for respective combinations of the plurality of components and the plurality of processing parameters, a plurality of respective performance properties;
  receiving, by the server, as output from the machine learning model respective predicted performances of each of a plurality of design space candidates;
  statistically aggregating, by the server, the respective predicted performances to generate a capability map of the materials supplier, the capability map being a data structure storing possible combinations of performance properties specific to the materials supplier and a respective likelihood of developing a composition with that combination of performance properties, the composition being a combination of the candidate components, the likelihood determined based on at least one of a candidate component of the design space most likely to achieve a given property at a given point in an output space and a predicted density of candidates in the output space;

receiving, by the server, using the communications network, from a client device of a user, input of one or more desired performance properties; and outputting, by the server, using the communications network, to the client device of the user, a user interface for display to the user indicating data of the capability map corresponding to the input one or more desired performance properties, wherein the capability map is queried by the user or a machine at a specified region in performance space and responsively returns a likelihood of achieving the properties within that region, and wherein the data of the capability map displayed to the user comprises a heat map corresponding to two or more user-selected dimensions and an indication of the likelihood.

2. The method of claim 1, wherein the capability map is in a space comprising three or more dimensions, wherein the user interface comprises a selectable option to select two properties of interest, and wherein responsive to receiving a selection of the two properties of interest, the heat map is output.

3. The method of claim 1, further comprising:
receiving a selection of properties from the user via the user interface; and
transmitting the selected properties to the materials supplier.

4. The method of claim 1, wherein the user interface includes a visualization of the capability map, and wherein generating the visualization comprises generating, for each depicted region of performance space, an indication of whether the region is attainable by any candidate in the design space.

5. The method of claim 4, wherein the visualization represents a summed probability density of the design space candidates over a region of performance space.

6. The method of claim 4, further comprising receiving a selection of two properties from the user, wherein the visualization is a two-dimensional graph that uses the two properties as its x-axis and y-axis.

7. The method of claim 1, wherein the capability map is configured to be manipulated or combined using additional mathematical functions to combine capability maps, conduct analysis, or for filtering purposes.

8. The method of claim 1, wherein the user interface includes a visualization of the capability map, and wherein generating the visualization comprises generating, for each depicted region of performance space, a likelihood of achieving the properties within that region.

9. A non-transitory computer-readable medium comprising memory with instructions encoded thereon for generating a capability map, the instructions, when executed, causing one or more processors to perform operations, the instructions comprising instructions to:

receive, by a server including a processor, using a communications network, from a client device of a materials supplier, one or more design spaces, the one or more design spaces comprising:
candidate components comprising materials and/or chemicals available to the materials supplier, and
tool capabilities of tools available to the materials supplier for manipulating the candidate components, wherein the manipulating comprises at least one of physically or chemically processing one or more of the candidate components;

input, by the server, at least one design space of the one or more design spaces into a machine learning model, the machine learning model trained using training data received from the materials supplier, wherein the training data comprises historical data representative of combinations of components produced by the materials supplier using one or more of the tools, the training data comprising:
a plurality of input materials and/or chemicals,
a plurality of processing parameters relating to use of one or more of the tools in processing the input materials and/or chemicals,
and for respective combinations of the plurality of components and the plurality of processing parameters, a plurality of respective performance properties;

receive, by the server, as output from the machine learning model respective predicted performances of each of a plurality of design space candidates;

statistically aggregate, by the server, the respective predicted performances to generate a capability map of the materials supplier, the capability map being a data structure storing possible combinations of performance properties specific to the materials supplier and a respective likelihood of developing a composition with that combination of performance properties, the composition being a combination of the candidate components, the likelihood determined based on at least one of a candidate component of the design space most likely to achieve a given property at a given point in an output space and a predicted density of candidates in the output space;

receive, by the server, using the communications network, from a client device of a user, input of one or more desired performance properties; and output, by the server, using the communications network, to the client device of the user, a user interface for display to the user indicating data of the capability map corresponding to the input one or more desired performance properties, wherein the capability map is queried by the user or a machine at a specified region in performance space and responsively returns a likelihood of achieving the properties within that region, and wherein the data of the capability map displayed to the user comprises a heat map corresponding to two or more user-selected dimensions and an indication of the likelihood.

10. The non-transitory computer-readable medium of claim 9, wherein the capability map is in a space comprising three or more dimensions, wherein the user interface comprises a selectable option to select two properties of interest, and wherein the instructions further comprise instructions to, responsive to receiving a selection of the two properties of interest, the heat map is output.

11. The non-transitory computer-readable medium of claim 9, wherein the user interface includes a visualization of the capability map, and wherein generating the visualization comprises generating, for each depicted region of performance space, an indication of whether the region is attainable by any candidate in the design space.

12. The non-transitory computer-readable medium of claim 11, wherein the visualization represents a summed probability density of the design space candidates over a region of performance space.

13. The non-transitory computer-readable medium of claim 11, wherein the instructions further comprise instructions to receive a selection of two properties from the user, wherein the visualization is a two-dimensional graph that uses the two properties as its x-axis and y-axis.

14. The non-transitory computer-readable medium of claim 10, wherein the capability map is configured to be manipulated or combined using additional mathematical functions to conduct analysis, or for filtering purposes.

15. The non-transitory computer-readable medium of claim 9, wherein the user interface includes a visualization of the capability map, and wherein generating the visualization comprises generating, for each depicted region of performance space, a likelihood of achieving the properties within that region.

16. A system comprising:
memory with instructions encoded thereon for generating a capability map; and
one or more processors that, when executing the instructions, perform operations comprising:
receiving, by a server including a processor, using a communications network, from a client device of a materials supplier, one or more design spaces, the one or more design spaces comprising:
candidate components comprising materials and/or chemicals available to the materials supplier, and
tool capabilities of tools available to the materials supplier for manipulating the candidate components, wherein the manipulating comprises at least one of physically or chemically processing one or more of the candidate components;
inputting, by the server, at least one design space of the one or more design spaces into a machine learning model, the machine learning model trained using training data received from the materials supplier, wherein the training data comprises historical data representative of combinations of components produced by the materials supplier using one or more of the tools, the training data comprising:
a plurality of input materials and/or chemicals,
a plurality of processing parameters relating to use of one or more of the tools in processing the input materials and/or chemicals,
and for respective combinations of the plurality of components and the plurality of processing parameters, a plurality of respective performance properties;
receiving, by the server, as output from the machine learning model respective predicted performances of each of a plurality of design space candidates;
statistically aggregating, by the server, the respective predicted performances to generate a capability map of the materials supplier, the capability map being a data structure storing possible combinations of performance properties specific to the materials supplier and a respective likelihood of developing a composition with that combination of performance properties, the composition being a combination of the candidate components, the likelihood determined based on at least one of a candidate component of the design space most likely to achieve a given property at a given point in an output space and a predicted density of candidates in the output space;
outputting, by the server, using the communications network, to the client device of the user, a user interface for display to the user indicating data of the capability map corresponding to the input one or more desired performance properties, wherein the capability map is queried by the user or a machine at a specified region in performance space and responsively returns a likelihood of achieving the properties within that region, and wherein the data of the capability map displayed to the user comprises a heat map corresponding to two or more user-selected dimensions and an indication of the likelihood.

17. The system of claim 16, wherein the capability map is in a space comprising three or more dimensions, wherein the user interface comprises a selectable option to select two properties of interest, and wherein responsive to receiving a selection of the two properties of interest, outputting a graph showing levels of achievability in two dimensions corresponding to the two properties of interest.

18. The system of claim 17, wherein the capability map can be manipulated and combined using additional mathematical functions to conduct analysis or for filtering purposes.

* * * * *

UNITED STATES PATENT AND TRADEMARK OFFICE
CERTIFICATE OF CORRECTION

PATENT NO. : 11,004,037 B1  
APPLICATION NO. : 17/075031  
DATED : May 11, 2021  
INVENTOR(S) : Ling et al.

It is certified that error appears in the above-identified patent and that said Letters Patent is hereby corrected as shown below:

On the Title Page

In Column 2, Item (58), under "Field of Classification Search", Line 1, after "G06N 20/00;" insert -- G06N 20/20; --.

In the Claims

In Column 19, in Claim 14, Line 4, delete "claim 10," and insert -- claim 9, --, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*